United States Patent [19]
Reed et al.

[11] Patent Number: 6,038,091
[45] Date of Patent: Mar. 14, 2000

[54] MAGNETIC DISK DRIVE READ CHANNEL WITH DIGITAL THERMAL ASPERITY DETECTOR

[75] Inventors: David E. Reed, Westminster; William G. Bliss, Thornton; German S. Feyh, Boulder, all of Colo.

[73] Assignee: Cirrus Logic, Inc., Fremont, Calif.

[21] Appl. No.: 08/944,224

[22] Filed: Oct. 6, 1997

[51] Int. Cl.[7] .............................. G11B 5/09; G11B 5/02; G11B 5/035; G11B 15/12

[52] U.S. Cl. ................................ 360/46; 360/25; 360/65; 360/61

[58] Field of Search ................................ 360/25, 46, 53, 360/61, 65

[56] References Cited

U.S. PATENT DOCUMENTS

| | | | |
|---|---|---|---|
| 4,378,605 | 3/1983 | Bauman, Jr. et al. | |
| 4,914,398 | 4/1990 | Jove et al. | 328/167 |
| 5,057,785 | 10/1991 | Chung et al. | 328/162 |
| 5,233,482 | 8/1993 | Galbraith et al. | 360/46 |
| 5,410,439 | 4/1995 | Egbert et al. | 360/75 |
| 5,420,736 | 5/1995 | Heim et al. | 360/113 |
| 5,438,460 | 8/1995 | Coker et al. | |
| 5,701,314 | 12/1997 | Armstrong et al. | 371/40.4 |
| 5,715,110 | 2/1998 | Nishiyama et al. | 360/67 |
| 5,847,890 | 12/1998 | Hattori | 360/51 |

FOREIGN PATENT DOCUMENTS

0 783 168 A2   7/1997   European Pat. Off. .

OTHER PUBLICATIONS

"Slider–Disk Asperity Hit Detector", IBM Technical Disclosure Bulletin, vol. 34, No. 7B, pp. 11–13, Dec. 1991.

*Primary Examiner*—W. Chris Kim
*Attorney, Agent, or Firm*—Dan Shifrin

[57] ABSTRACT

A thermal asperity-tolerant read channel is provided for a magnetic disk drive. Thermal asperities are detected by a digital detector which includes a pre-filter, a first threshold comparator and, optionally, a second threshold comparator. The pre-filter reduces noise and signal variation in the analog-to-digital converter output to enable better detection of a DC shift caused by a thermal asperity. The first threshold comparator compares the pre-filter output to a predetermined level; if the predetermined level is exceeded, the comparator output is set to one state, providing an initial indication of the presence of a thermal asperity. The optional second threshold comparator determines whether, out of a predetermined number of comparator outputs, the number in the one state exceeds programmed value; if so, the second threshold comparator outputs a final indication of the presence of a thermal asperity. In such a manner, accurate detection of thermal asperities is enhanced while reducing the likelihood of false detection. When a thermal asperity is detected, one or more of the following features can be activated to reduce the adverse effects of the thermal asperity: a squelch connected to the inputs of the variable gain amplifier; a loop-hold feature to maintain channel parameters such as timing, offset and gain until the effects of the thermal asperity have dissipated; and a user data erasure pointer to flag data which has been corrupted by the thermal asperity and which needs to be corrected by ECC circuitry.

28 Claims, 3 Drawing Sheets

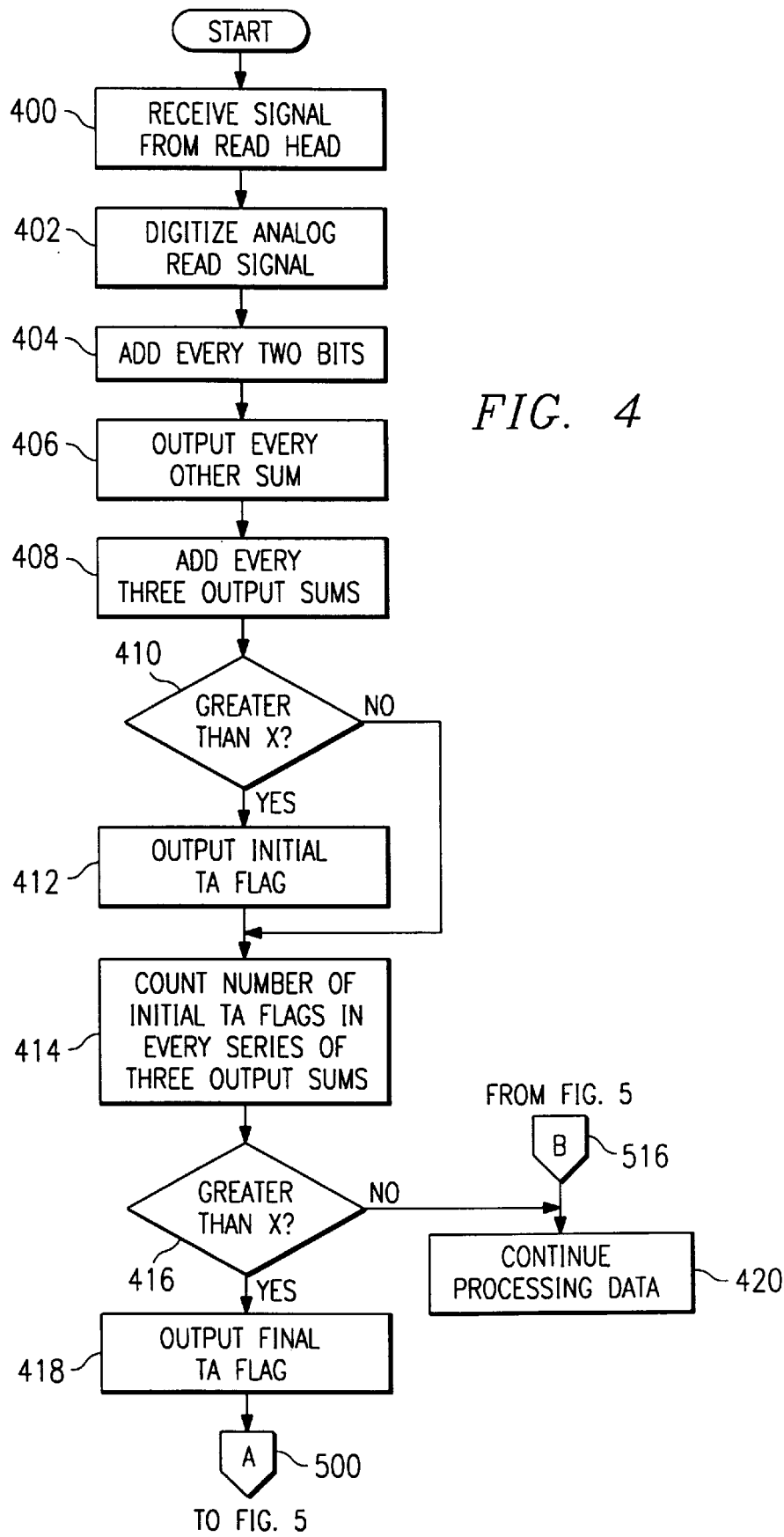

MAGNETIC DISK DRIVE READ CHANNEL WITH DIGITAL THERMAL ASPERITY DETECTOR

FIELD OF THE INVENTION

The present invention relates generally to magnetic disk drive read channels, and more specifically to thermal asperity detectors for such channels.

BACKGROUND OF THE INVENTION

In a magnetic disk drive, a read element, such as an inductive head or, more recently, a magneto-resistive ("MR") head, is used to detect magnetic flux changes on the disk, representative of recorded digital data. The resistance of the MR element inversely proportional to the strength of the magnetic flux such that the resistance increases as a flux transition on moving media approaches the element. (The resistance of the element is also proportional to its temperature.) When a constant current is passed through the MR element, the detected voltage across the element represents the analog read signal with its alternating-polarity pulses.

It is the role of the read channel to separate the raw analog read signal from extraneous noise and then convert the resulting signal into digital bits which can be converted into useful data. One source of noise is known as a thermal asperity ("TA") which occurs when an MR element physically strikes a blemish or asperity on the surface of the disk. The result is an immediate and significant increase in the temperature of the element with a corresponding increase in its resistivity. This, in turn, results in a voltage transient in the analog read signal which can mask valid flux changes as the transient decays exponentially and can introduce errors into the read signal. For accurate reproduction of the data, the errors must be detected and corrected by an error correcting code ("ECC"). FIG. 1A is a plot of an analog read signal 100 showing a TA transient 110. When the MR element strikes an asperity, the DC offset of the read signal increases to a point of saturation 112 then decays 114 back to a level within the operating range 102 of the DC offset. During the decay period 116, which can last about 100 to 1000 channel bits, the detected digital data will contain errors.

Although ECC circuitry may be used to detect and correct "hard" errors caused by thermal asperities (as well as to detect and correct "soft" errors caused by other sources of channel noise), doing so increases the cost and complexity of the ECC circuitry and increases the amount of ECC data added to the user data recorded onto the disk, thereby reducing the usable storage capacity of the disk. Consequently, efforts have been made to devise dedicated TA detection and compensation methods. For example, in one common method of detecting a TA (as described in commonly-assigned U.S. patent application Ser. No. 08/576, 742 to Armstrong et al. entitled ON-THE-FLY ERROR CORRECTION USING THERMAL ASPERITY ERASURE POINTERS FROM A SAMPLED AMPLITUDE READ CHANNEL IN A MAGNETIC DISK DRIVE, hereinafter referred to as "Armstrong" and hereby incorporated by reference), a TA is assumed to have occurred when analog-to-digital converter ("ADC") samples in the read channel saturate. However, when ADC saturation is relied upon for TA detection, some "mild" TA events may go undetected and the data they mask remain uncorrected. For example, detection of a TA through saturation of a 6-bit ADC may occur at 31 least significant bits ("lsb") of the ADC sample. However, if it is desirable to detect a small TA of as little as 20 least significant bits, not only can saturation detection not be sufficiently sensitive to true TAs, but it can be overly sensitive to false TAs. In fact, there may typically be only about 3.5 standard deviations of noise between the signal peak and the saturation level. Therefore, the probability is very high that an ADC sample will saturate due to noise: perhaps an unacceptable one sample out of every 1000 to 10,000 will saturate and register as a TA. And, while reducing the saturation level might allow smaller TAs to be detected, the number of false, noise-caused TA detections will increase still further by the reduced headroom between the analog signal peak and the saturation level.

Regardless of the detection method employed, once a TA has been detected, an effort must be made to recover data which is masked or distorted while the TA decays. Examples of compensation (again, as described in Armstrong et al.) include: increasing the pole of an AC coupling capacitor; holding parameters of the timing and gain control loops in a constant state; and/or increasing the headroom of the ADC. FIG. 1B illustrates the effect of TA compensation on the analog read signal 100. Elevating the pole of the AC coupling capacitor reduces the apparent TA time constant, thereb reducing the amount of time the ADC is saturated 122. The DC offset 124 thus decays more rapidly to the proper operating level 102, reducing the number of data bits corrupted by the TA 120. Ideally, the corrupted data bits can be detected and corrected by ECC circuitry. Additionally, after the ADC samples come out of saturation, the ADC headroom is increased to scale the samples to fit within the acceptable operating range of the read channel, thereby reducing the load on expensive and complex ECC circuitry.

As with the known TA detection methods, the foregoing compensation techniques also have drawbacks. Increasing the ADC headroom by decreasing signal gain tends to increase the number of soft errors due to reduced ADC resolution. Moreover, the number of soft errors may exceed the error correction capability of the ECC circuitry and force the read channel to attempt to re-read the data on subsequent revolutions of the disk. As will be appreciated, any resulting increase in access time is generally undesirable. And, additional soft errors can also occur through transients introduced into the signal when the ADC headroom is readjusted back to its normal operating range.

SUMMARY OF THE INVENTION

The present invention provides a read channel, and a thermal asperity detector therefore, which reduces the adverse effects of thermal asperities on the surface of magnetic disks. The detector includes a pre-filter coupled to an analog-to-digital converter ("ADC") in the read channel, which averages the values of a predetermined number of samples from the ADC, and a module to generate an initial flag if the value of the predetermined ADC samples exceeds a predetermined value, indicative of the probable presence of a thermal asperity. The detector can optionally include another module to generate a final flag if there are a predetermined number of initial flags out of a predetermined number of consecutive ADC samples. When a final flag is generated, a squelch circuit, connected to the inputs of a variable gain amplifier in the read channel, can be activated for a programmed period of time. A hard squelch can quickly remove the large offset caused by the asperity while a soft squelch can remove transients left by the hard squelch. Additionally, a loop-hold feature can be activated to maintain certain parameters in the read channel constant, such as gain, timing and/or offset. And further, ECC erasure pointers can be generated to enable more efficient use of ECC circuitry.

More specifically, the pre-filter includes a first stage to sum a predetermined number of ADC values and output every other such sum and a second stage for summing a predetermined number of sums output from the first stage. A comparator compares the sum output from the second stage with a predetermined value and, if the value is exceeded, generates an initial flag, indicating the probable presence of a thermal asperity. The second module which generates a final flag includes registers to store consecutive comparator outputs and a second comparator to generate the final flag if, of the comparator outputs stored in the registers, a predetermined number (such as two out of three) are in the initial flag state. If an insufficient number are in the initial flag state, then the presence of a thermal asperity has not been verified.

The foregoing and other features and advantages of the invention will be apparent from the following more particular description of preferred embodiments of the invention, as illustrated in the accompanying drawings.

BRIEF DESCRIPTION OF THE DRAWINGS

FIG. 4 is a flow chart of a thermal asperity detection process of the present invention.

DETAILED DESCRIPTION OF THE INVENTION

Figure 2:
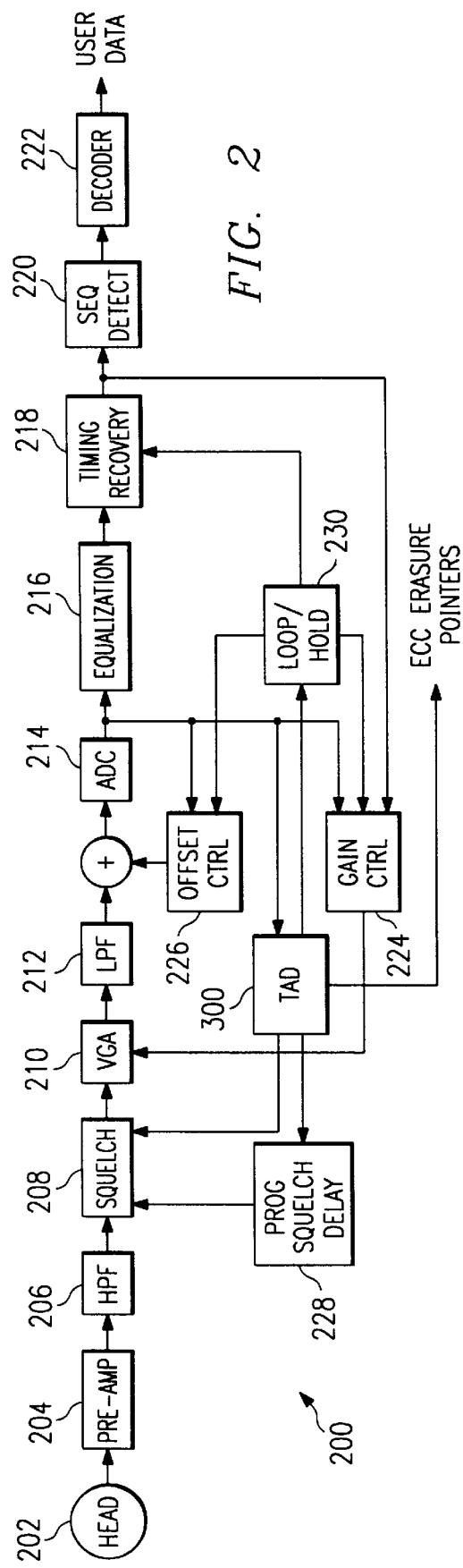
FIG. 2 is a block diagram of the read channel of the present invention.

FIG. 2 is a block diagram of a read channel 200 in which the thermal asperity ("TA") detection and compensation techniques of the present invention have been incorporated. The read channel 200 includes a read element 202, which detects magnetic flux changes in a storage disk, and a pre-amp 204 to amplify the very low amplitude of the analog signal from the read element 202 (Step 400, FIG. 4). A high pass filter 206 removes the DC component from the signal from the pre-amp 204. The high pass filter 206 can include an external resistor and inductor across the outputs of the pre-amp 204. As will be explained in more detail below, a switchable, programmable squelch circuit 208 can remove at least a portion of any transients caused by a TA. A variable gain amplifier ("VGA") 210 adjusts the amplitude of the read signal and a low pass, analog receive filter 212 provides initial equalization toward a desired response as well as attenuating noise.

A sampling device, such as an analog-to-digital converter ("ADC") 214, samples the analog read signal from the filter 212 and outputs a corresponding digital ADC sample signal (Step 402). A discrete time filter 216 provides further equalization toward the desired response. A timing recovery circuit 218 receives the equalized sample values and adjusts the frequency and phase of samples from the ADC 214 (or other sampling device). From the timing recovery circuit 218, the sample values are further processed by a sequence detector 220 and the user data decoded by a decoder 222 in a known manner.

Sampled values from the ADC 214 are also received by a decision-directed gain control 224 and a DC offset control 226 which respectively adjust the amplitude of the read signal through the VGA 210 and the DC offset at the ADC 214.

The read channel 200 of the present invention further includes a thermal asperity detector ("TAD") 300 coupled to receive sampled values from the ADC 214. Outputs of the TAD 300 are coupled to the timing recovery 218, the gain control 220, the squelch 208 and a programmed squelch delay 228. The TAD 300 also outputs ECC erasure pointers for improving the efficiency with which errors caused by TA's can be corrected.

Figure 3:
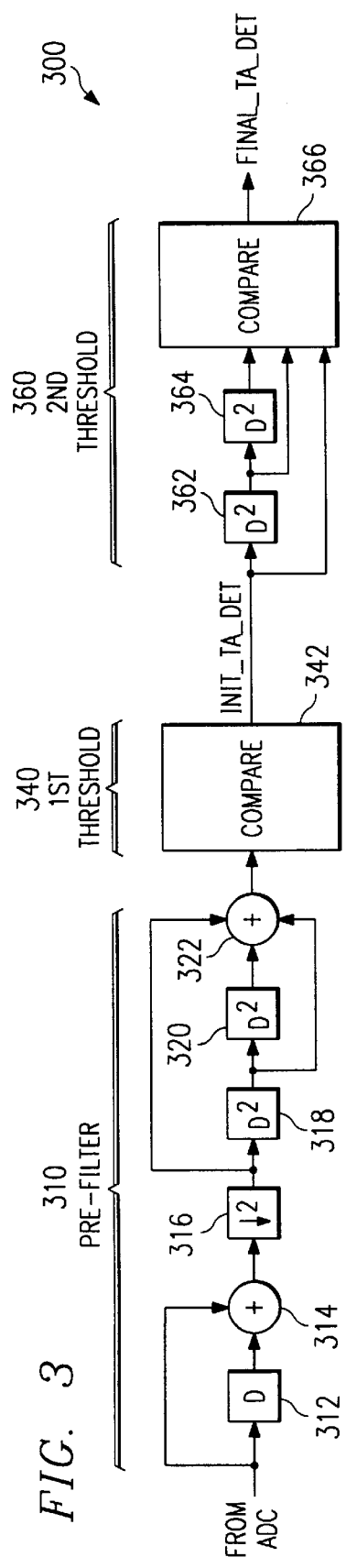
FIG. 3 is a block diagram of the thermal asperity detector of the present invention.

In one implementation of the read channel 200, the analog portion (including the ADC 214) operates at a clock frequency of $f_a$ while much of the digital portion beyond the ADC 214 operates at a lower clock frequency of $f_d = \frac{1}{2} f_a$. To reduce the amount of circuitry required without significantly adversely affecting the speed of operation, the TAD 300 of the present invention includes a delay register and an adder operating at the ADC speed of $f_a$ while the balance of the TAD 300 operates at the half-speed of $f_d$ as more fully described with reference to the block diagram of FIG. 3.

The TAD 300 includes a pre-filter section 310, a threshold section 340 and, optionally, a second threshold section 360. The pre-filter section 310 includes, in series, a first delay register 312 (coupled to the output of the ADC 214), a summer 314 and a decimater 316 in a first stage and second and third delay registers 318 and 320 and a second summer 322 in a second stage. The first summer 314 is coupled to both the output of the ADC 214 and the output of the first delay register 312; the second summer 322 is coupled to the outputs of the decimater 316, the second delay register 318 and the third delay register 320. In the embodiment shown in FIG. 3, the pre-filter section 310 averages six ADC samples by summing two samples at a time in the fist summer 314 (Step 404). The decimater 316 receives each sum from the first summer 314 and outputs every other such sum (Step 406). The decimated sums are further filtered by a moving window (comprised of the second and third delay registers 318 and 320 and the summer 322) to generate a combined sum of three decimator outputs (representing six ADC samples) (Step 408). The delay registers 318 and 320 and the second summer 322 process each decimated sum at a speed which is one-half the speed with which the ADC 214 generates ADC sample values. Alternatively, the two delay registers 318 and 320 can operate at the same speed as the ADC 214 but hold decimated sums for two clock pulses. Moreover, in conjunction with another decimater (not shown), the second summer 322 can output every other sum to the first threshold section 340.

The threshold section 340 includes a comparator 342 which is coupled to the output of the second summer 322 and which outputs an initial digital thermal asperity detection signal INIT_TA_DET. A bit in the INIT_TA_DET signal is in a "positive" state when the value from the second summer 322 exceeds a predetermined value, thereby flagging the probable presence of a TA (Steps 410, 412) (in this application, the term "positive state" has been arbitrarily selected as a convenience to refer to a predetermined one of the two states of a digital signal, without reference to a polarity; it may be a binary zero or a binary one and need not be the same as the "positive state" of any other digital signal generated in the TAD 300).

In order to accurately detect a TA, there should be an adequate margin of headroom between a typical signal peak (which is between about 16 to about 24 lsbs for a single sample) and the level of the smallest TA to be detected. For example, it might be desirable to program the first threshold section 340 to detect a TA having a level as small as about 20 lsbs. If the pre-filter 310 is bypassed and the digital value of only one ADC sample (16–24 lsbs) is compared with the 20 lsb level in the comparator 342, there will be little or no headroom and no appreciable margin for noise resulting in an almost constant stream of false TA detections. If the threshold section 340 receives the average of two ADC samples (with a typical combined value of 30–38 lsbs) from the pre-filter 310 for comparison with 40 lsbs (representing the sum of the offsets on two consecutive channel bits affected by a TA), the maximum headroom increases slightly to about 2 lsbs (or about 0.7 standard deviations), which is still not sufficient to reduce false TA detection to an acceptable level. However, when four ADC samples (with a typical combined value of 30–60 lsbs) are compared with an 80 lsb TA level, the headroom jumps to a minimum of about 20 lsbs (or 5 standard deviations), a level at which noise can be expected to trigger a false TA detection every 100,000 to 1,000,000 bits. And, if six ADC samples (with a typical value of 30–65 lsbs) are compared with a 120 lsb TA level, the headroom becomes 55 lsbs (or 11 standard deviations). Only rarely would the noise level be great enough to falsely indicate a TA.

The accuracy of TA detection (including the reduction of the false TA detection rate) can be increased further with the addition of an optional second threshold section 360, also operating at an effective speed of $f_d=\frac{1}{2}f_a$ (by operating at an actual speed of $f_d$ or using registers to hold values for two clock cycles). The second threshold section 360 includes, in series, fourth and fifth delay registers 362 and 364 and a second comparator 366, the fourth delay register 362 being coupled to receive the INIT_TA_DET signal from the first comparator 342. The second comparator 366 is coupled to receive outputs from the first comparator 342 and the fourth and fifth delay registers 362 and 364 and outputs a final digital thermal asperity detection signal FINAL_TA_DET which is in the positive state if a predetermined number of the three most recent INIT_TA_DET bits are in the positive state, thereby verifying the presence of a TA (Steps 414, 416, 418). For example, the second comparator 366 can be programmed to flag the presence of a TA (that is, the FINAL_TA_DET signal will be in the positive state) if two of the most recent three INIT_TA_DET bits are in the positive state.

As will be appreciated, the pre-filter 310 can be modified to average greater or fewer numbers "R" of samples, R being the product of a number "Q" of ADC sample values summed by the first summer 314 and a number "V" of decimated values summed by the second summer 322: Q-1 will be the number of registers in the first stage of the pre-filter 310 and V-1 will be the number of registers in the second stage. The second threshold 360 can be modified to output a FINAL_TA_DET signal in the positive state upon the detection of a greater (or fewer) number "T" of INIT_TA_DET bits in the positive state out of a greater (or fewer) number S of outputs from the first threshold 340: S-1 will be the number of delay registers in the second threshold 360. The accuracy of the TAD 300 can thereby be enhanced, although at the cost of an increased number of components and increased delays.

The thresholds of the first and second threshold sections 340 and 360 can be established in any of several ways. For simplicity and ease of design, the thresholds can be determined through simulations and calculations, or experimentally, to determine an appropriate balance between accurate detection of low level TAs and reduction of false detection. Once determined, each threshold can be designed into the read channel 200 as a constant. Alternatively, each magnetic disk drive into which the read channel of the present invention is incorporated can be calibrated at the time of production, thereby taking into account small variations between individual drives. If even greater accuracy is desired, the thresholds can be set to nominal values when the read channel 200 is manufactured. Then, during actual use, the thresholds can be automatically adjusted "on-the-fly" if, for example, the TAD 300 identifies too many false TAs.

Figure 1A:
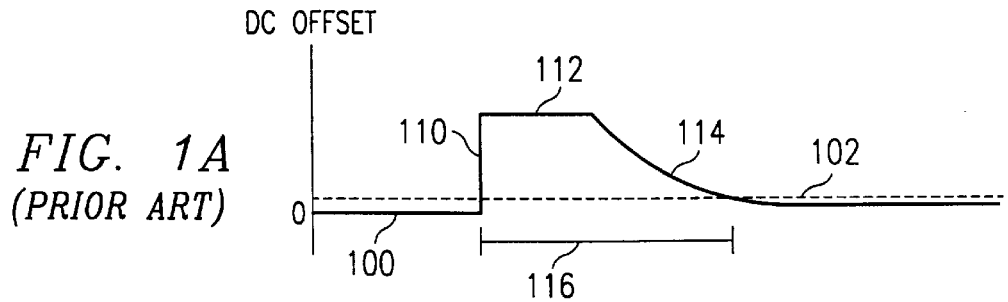
FIG. 1A is an exemplary plot of an analog read signal with a thermal asperity transient.
Figure 1B:
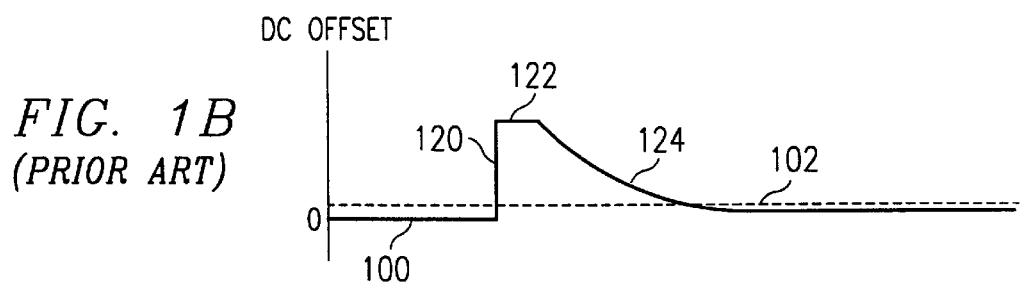
FIG. 1B is a plot of an read signal to which known compensation techniques have been applied.
Figure 5:
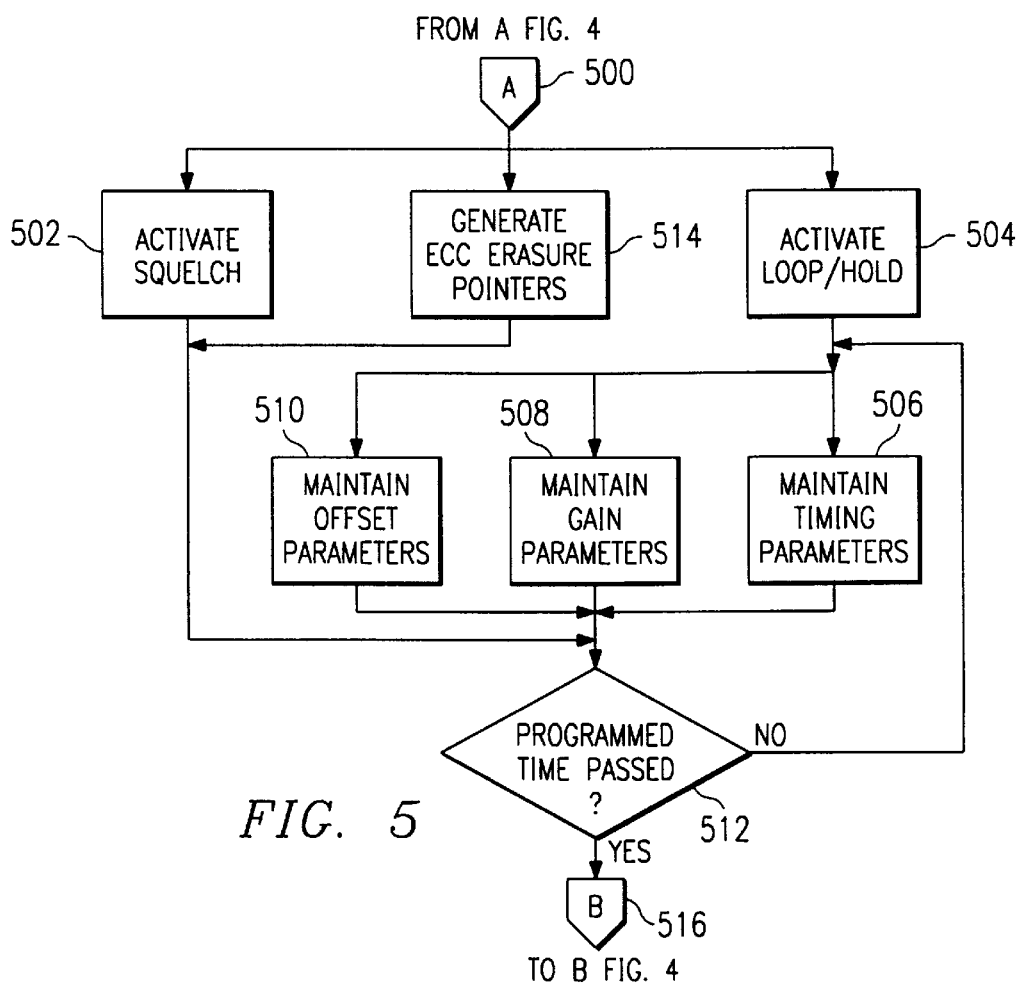
FIG. 5 is a flow chart of compensation following thermal asperity detection.

Depending upon the threshold of detection, an INIT_TA_DET signal in the positive state can be generated approximately four to six channel bits after the onset of a TA (or, if the second threshold section 360 is employed, a FINAL_TA_DET signal can be generated in the positive state about eight channel bits after the onset). The programmable squelch circuit 208 can then be activated by the TAD 300 (Step 502, FIG. 5) to quickly remove large offsets caused by the TA while leaving a minimal transient. When the squelch circuit 208 is first activated, a resistance of about 200 ohms ("hard squelch") is switched across the input terminals of the variable gain amplifier (which has a nominal, unsquelched impedance of about 2000 ohms) to discharge the input capacitance for a length of time which is programmable in the squelch delay circuit 228. If desired, a second resistance of about 800 ohms ("soft squelch") can subsequently be switched across the input terminals for another programmable length of time to speed the decay of any signal or switching noise left by the hard squelch. The transient is thus greatly reduced and more easily handled by the high pass filter 206. With the squelch circuit 208 activated approximately 6 channel bits after the onset of the TA, the effects of the TA can be limited to only about 10 to 15 channel bits in duration.

The squelch circuit 208 can also be activated at the beginning of a TA by an externally programmable delay to reduce the effects of the TA to under 10 channel bits. In the externally activated mode, the location (or time) of the TA is detected and stored during a first attempt to read data from the rotating disk. During a re-read attempt, the squelch circuit 208 is activated at the beginning of the known occurrence of the TA. For maximum TA cancellation, the timing of activation of the squelch circuit 208 can be varied during subsequent re-read attempts. For example, using an internal timer or an externally or automatically programmed timer, the TA may be detected during a first read sequence and, during a subsequent re-read, the squelch circuit 208 may be activated six samples, for example, before the TA is reached.

In addition to activating the squelch circuit 208, an INIT_TA_DET or FINAL_TA_DET signal in the positive state can activate a loop-hold feature 230. When the loop-hold feature is activated (Step 504), parameters of the timing, gain and/or offset loops are held constant (Steps 506, 508, 510) for a programmable length of time (Step 512) during a TA to avoid loss of lock. Because the equalization filter 216 and the timing recovery circuit 218 introduce delays into the channel 200, the loops which use the timing recovery output are held constant for an extended interval corresponding to the equalization and timing recovery delays. The loop-hold feature can also be activated by the external squelch trigger, if used.

An INIT_TA_DET or FINAL_TA_DET signal in the positive state also can generate erasure pointers (Step 514) to flag data which, despite the TA detection and correction provided by the present invention, become corrupted by a TA. When such erasure pointers are generated, the ECC module of the read channel 200 is programmed to increase its error correction capacity during subsequent attempts to re-read the data.

While the invention has been particularly shown and described with reference to preferred embodiments thereof, it will be understood by those skilled in the art that various changes in form and details may be made therein without departing from the spirit and scope of the invention as set forth in the appended claims.

What is claimed is:

1. A digital thermal asperity detector for a magnetic disk drive read channel, comprising:

a pre-filter coupled to an analog-to-digital converter in the read channel, the analog-to-digital converter generating ADC samples having digital values, said pre-filter for averaging the values of a first predetermined number of consecutive ADC samples;

a first threshold module coupled to said pre-filter for generating a first TA flag if the average value of the first predetermined number of consecutive ADC samples exceeds a predetermined value, indicative of the possible presence of a thermal asperity; and a second threshold module for increasing the accuracy of the digital thermal asperity detector by generating a second TA flag if, out of a second predetermined number of consecutive ADC samples, the number of first TA flags exceeds a third predetermined number, thereby verifying the presence of the possible thermal asperity indicated by said first threshold module.

2. The thermal asperity detector of claim 1, wherein said pre-filter comprises:

a first stage coupled to the analog-to-digital converter for generating a first-stage value by summing a predetermined number of values of ADC samples; and a second stage coupled to said first stage for generating a second-stage value by summing a predetermined number of first stage values.

3. The thermal asperity detector of claim 2, wherein said first stage of said pre-filter comprises:

a delay register coupled to the analog-to-digital converter for temporarily storing the value of an ADC sample from the analog-to-digital converter;

a summer coupled to said delay register and the analog-to-digital converter for adding the value of the ADC sample stored in said delay register to the value of a next ADC sample from the analog-to-digital converter and for providing a summer output; and a decimater coupled to said summer for generating the first-stage value representing every other summer output.

4. The thermal asperity detector of claim 2, wherein said second stage comprises:

a first delay register coupled to said first stage of said pre-filter for temporarily storing a first first-stage value;

a second delay register coupled to said first delay register for temporarily storing a second first-stage value; and a summer coupled to said first and second delay registers and said first stage for adding a third first-stage value, the first first-stage value and the second first-stage value.

5. The thermal asperity detector of claim 1, wherein said second threshold module comprises:

a first delay register coupled to said first threshold module for temporarily storing a first TA flag from said first threshold module;

a second delay register coupled to said first delay register for temporarily storing a next TA flag from said first threshold module; and a comparator coupled to said first threshold module and to said first and second delay registers for generating the second TA flag if, out of the second predetermined number of consecutive ADC samples, the number of first TA flags exceeds the third predetermined number.

6. A digital thermal asperity detector for a magnetic disk drive read channel, comprising:

a pre-filter coupled to an analog-to-digital converter in the read channel, the analog-to-digital converter generating ADC samples having digital values, said pre-filter for averaging the values of a predetermined number R of consecutive ADC samples;

a first threshold module coupled to said pre-filter for generating an INIT_TA_DET bit, the INIT_TA_DET bit being in a positive state if the average value of the R consecutive ADC samples exceeds a predetermined value; and a second threshold module for generating a FINAL_TA_DET bit, the FINAL_TA_DET bit being in a positive state if, out of a predetermined number S of consecutive INIT_TA_DET bits, the number of INIT_TA_DET bits in the positive state exceeds a predetermined number T.

7. The thermal asperity detector of claim 6, wherein said pre-filter comprises:

a first summer for adding the values of a predetermined number Q of consecutive ADC samples from the analog to digital converter and for providing a summer output;

a decimater coupled to said first summer for generating a decimater output representing every Qth summer output; and a second summer for adding a predetermined number V of consecutive decimater outputs, where Q*V=R.

8. The thermal asperity detector of claim 7, wherein said pre-filter further comprises:

a plurality Q-1 of first delay registers coupled in series, a first of said first delay registers coupled to receive ADC samples from the analog-to-digital converter, each other of said first delay registers coupled to an immediately preceding one of said first delay registers;

said first summer coupled to each of said first delay registers and the analog-to-digital converter for adding the values of ADC samples stored in said first delay registers with the value of an ADC sample received directly from the analog-to-digital converter;

a plurality V-1 of second delay registers coupled in series, a first of said second delay registers coupled to receive a decimater output from said decimater, each other of said second delay registers coupled to an immediately preceding one of said second delay registers; and said second summer coupled to each of said second delay registers and said decimater for adding decimater outputs stored in said second delay registers with a decimater output received directly from said decimater.

9. The thermal asperity detector of claim 6, wherein S=3 and said second threshold module comprises:

a plurality S-1 of delay registers coupled in series, a first of said plurality of delay registers coupled to receive INIT_TA_DET bits from said first threshold module, each other of said plurality of delay registers coupled to an immediately preceding one of said plurality of delay registers; and a comparator coupled to said first threshold module and to each of said plurality of delay registers for generating the FINAL_TA_DET bit, the FINAL_TA_DET bit being in the positive state if, out of the predetermined number S of consecutive INIT_TA_DET bits, the number of INIT_TA_DET bits in the positive state exceeds the predetermined number T.

10. A thermal asperity-tolerant magnetic read channel, comprising:

a variable gain amplifier having inputs to receive analog signals from a magnetic read head;

an analog receive filter interconnected with an output of said variable gain amplifier;

an analog-to-digital converter interconnected with an output of said analog receive filter;

an equalizer interconnected with an output of said analog-to-digital converter;

a timing control interconnected with an output of said equalizer;

a digital thermal asperity detector interconnected with said output of said analog-to-digital converter;

a switchable-input squelch module responsive to said digital thermal asperity detector and being interconnected between an input coupling network and the inputs of said variable gain amplifier, said switchable-input squelch module having:

a first, hard squelch level switchable across the inputs of said variable gain amplifier for a first predetermined period of time to attenuate an amplitude of the analog signal from the magnetic read head; and a second, soft squelch level switchable across the inputs of said variable gain amplifier for a second predetermined period of time following the first predetermined period of time to reduce residual noise from said first, hard squelch level.

11. The read channel of claim 10, wherein said digital thermal asperity detector comprises:

a pre-filter coupled to said analog-to-digital converter, the analog-to-digital converter generating ADC samples having digital values, said pre-filter for averaging the values of a first predetermined number of consecutive ADC samples; and a first threshold module coupled to said pre-filter for generating a first TA flag if the average value of the first predetermined number of consecutive ADC samples exceeds a predetermined value, indicative of the possible presence of a thermal asperity.

12. The read channel of claim 11, wherein said pre-filter comprises:

a first stage coupled to said analog-to-digital converter for generating a first-stage value by summing a predetermined number of values of ADC samples; and a second stage coupled to said first stage for generating a second-stage value by summing a predetermined number of first stage values.

13. The read channel of claim 12, wherein said first stage of said pre-filter comprises:

a delay register coupled to said he analog-to-digital converter for temporarily storing the value of an ADC sample from said analog-to-digital converter;

a summer coupled to said delay register and said analog-to-digital converter for adding the value of the ADC sample stored in said delay register to the value of a next ADC sample from said analog-to-digital converter and for providing a summer output; and a decimater coupled to said summer for generating the first-stage value representing every other summer output.

14. The read channel of claim 12, wherein said second stage of said pre-filter comprises:

a first delay register coupled to said first stage of said pre-filter for temporarily storing a first first-stage value;

a second delay register coupled to said first delay register for temporarily storing a second first-stage value; and a summer coupled to said first and second delay registers and said first stage for adding a third first-stage value, the first first-stage value and the second first-stage value.

15. The read channel of claim 11, wherein said digital thermal asperity detector further comprises a second threshold module for increasing the accuracy of said digital thermal asperity detector by generating a second TA flag if, out of a second predetermined number of consecutive ADC samples, the number of first TA flags exceeds a third predetermined number, thereby verifying the presence of the possible thermal asperity indicated by said first threshold module.

16. The read channel of claim 15 wherein said second threshold module comprises:

a first delay register coupled to said first threshold module for temporarily storing a first TA flag from said first threshold module;

a second delay register coupled to said first delay register for temporarily storing a next TA flag from said first threshold module; and a comparator coupled to said first threshold module and to said first and second delay registers for generating the second TA flag if, out of the second predetermined number of consecutive ADC samples, the number of first TA flags exceeds the third predetermined number.

17. The read channel of claim 11, wherein said pre-filter comprises:

a first summer for adding the values of a predetermined number Q of consecutive ADC samples from said analog-to-digital converter and for providing a summer output;

a decimater coupled to said first summer for generating a decimater output representing every Qth summer output; and a second summer for adding a predetermined number V of consecutive decimater outputs, where Q*V=R.

18. The read channel of claim 17, wherein said pre-filter further comprises:

a plurality Q-1 of first delay registers coupled in series, a first of said first delay registers coupled to receive ADC samples from said analog-to-digital converter, each other of said first delay registers coupled to an immediately preceding one of said first delay registers;

said first summer coupled to each of said first delay registers and said analog-to-digital converter for adding the values of ADC samples stored in said first delay registers with the value of an ADC sample received directly from said analog-to-digital converter;

a plurality V-1 of second delay registers coupled in series, a first of said second delay registers coupled to receive a decimater output from said decimater, each other of said second delay registers coupled to an immediately preceding one of said second delay registers; and said second summer coupled to each of said second delay registers and said decimater for adding decimater outputs stored in said second delay registers with a decimater output received directly from said decimater.

19. The read channel of claim 11, wherein said thermal asperity detector further comprises a second threshold module for increasing the accuracy of said thermal asperity detector by generating a second TA flag, the second TA flag being in a positive state if, out of a predetermined number S of consecutive first TA flags, the number of first TA flags in the positive state exceeds a predetermined number T, thereby verifying the presence of the possible thermal asperity indicated by said first threshold module.

20. The read channel of claim 19, wherein S=3 and said second threshold module comprises:

a plurality S-1 of delay registers coupled in series, a first of said plurality of delay registers coupled to receive first TA flags from said first threshold module, each other of said plurality of delay registers coupled to an immediately preceding one of said plurality of delay registers; and a comparator coupled to said first threshold module and to each of said plurality of delay registers for generating the second TA flag, the second TA flag being in the positive state if, out of the predetermined number S of consecutive first TA flags, the number of first TA flags in the positive state exceeds the predetermined number T.

21. The read channel of claim 10, wherein:

said input coupling network includes a high pass filter interconnected between said inputs of said variable gain amplifier and the magnetic read head; and the read channel further comprises a loop-hold circuit, responsive to said thermal asperity detector, for holding constant selected parameters of the read channel.

22. The read channel of claim 10, further comprising a user-data erasure pointer responsive to said thermal asperity detector and operable to identify user data which is corrupted by a detected thermal asperity.

23. The read channel of claim 10, further comprising a programmable delay module, responsive to said digital thermal asperity detector, to establish the first and second predetermined periods of time during which said first and second squelch levels are enabled.

24. A method of detecting thermal asperities in a magnetic disk drive read channel, comprising the steps of:

receiving an analog signal from a magnetic read head element;

converting the analog signal into a plurality of consecutive digital ADC sample values;

averaging the values of a first predetermined number of consecutive ADC sample values;

generating an initial digital TA detect signal in a positive state if the average value of the first predetermined number of consecutive ADC sample values exceeds a predetermined value; and generating a final digital TA detect signal, the final TA detect signal being in a positive state if, out of a predetermined number S of consecutive initial TA detect signals, the number of initial TA detect signals in the positive state exceeds a predetermined number T.

25. The method of claim 24, wherein said step of filtering comprises the steps of:

adding the values of a predetermined number Q of consecutive ADC samples from the analog-to-digital converter and for providing a summer output;

generating a decimater output representing every Qth summer output; and adding a predetermined number V of consecutive decimater outputs, where Q*V=R.

26. A method of detecting and compensating for the presence of thermal asperities in a magnetic disk live read channel, comprising the steps of:

receiving in a variable gain amplifier an analog signal from a magnetic read head element, the analog signal representing data on a magnetic disk;

converting the analog signal into a plurality of consecutive digital ADC sample values;

averaging a first predetermined number of consecutive ADC sample values;

generating a TA detect signal in a positive state if the average value of the first predetermined number of consecutive ADC sample values exceeds a predetermined value;

upon generation of a TA detect signal in a positive state:
activating a squelch across inputs of the variable gain amplifier at a first, hard level for a first predetermined period of time;
at the conclusion of the first predetermined period of time, activating the squelch across the inputs of the variable gain amplifier at a second, soft level for a second predetermined period of time; and
at the conclusion of the second predetermined period of time, deactivating the squelch and upon generation of the TA detect signal in a positive state, activating a loop-hold circuit to hold constant parameters of at least one of timing, gain and offset loops of the read channel.

27. The method of claim 26, further comprising the step of, upon generation of the TA detect signal in a positive state, generating a user-data erasure pointer to identify a portion of the ADC sample values which may have been corrupted by a thermal asperity.

28. The method of claim 26, wherein said step of generating a TA detect signal in a positive state comprises the steps of:

generating an initial TA flag if the average value of a second predetermined number of consecutive ADC samples exceeds a predetermined value, indicative of the possible presence of a thermal asperity; and generating the TA detect signal in a positive state if, out of a third predetermined number of consecutive ADC samples, the number of initial TA flags exceeds a third predetermined number, thereby verifying the presence of the possible thermal asperity indicated by the initial TA flag.

* * * * *